Oct. 11, 1949.  L. J. WINCHELL  2,484,201
LAWN MOWER
Filed May 28, 1947
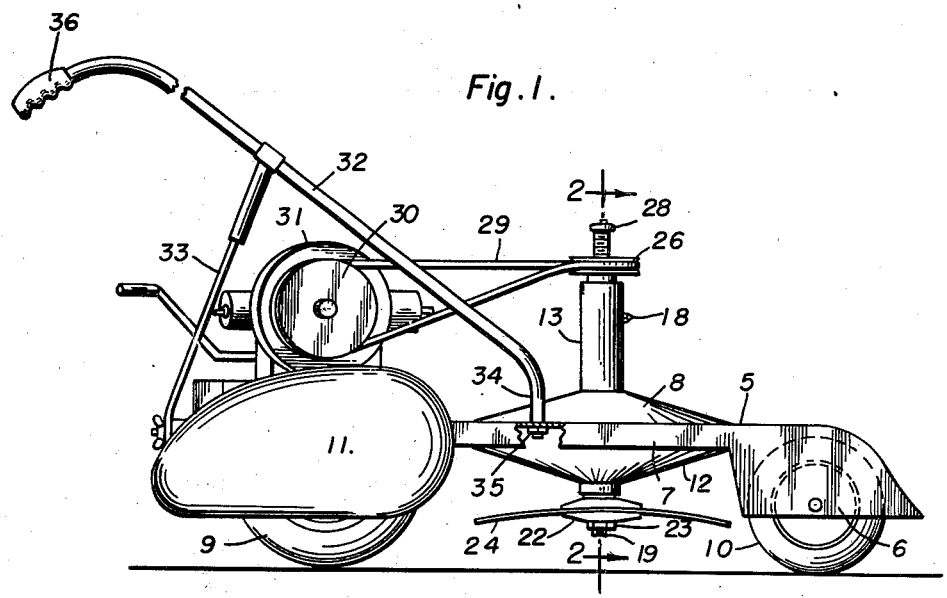
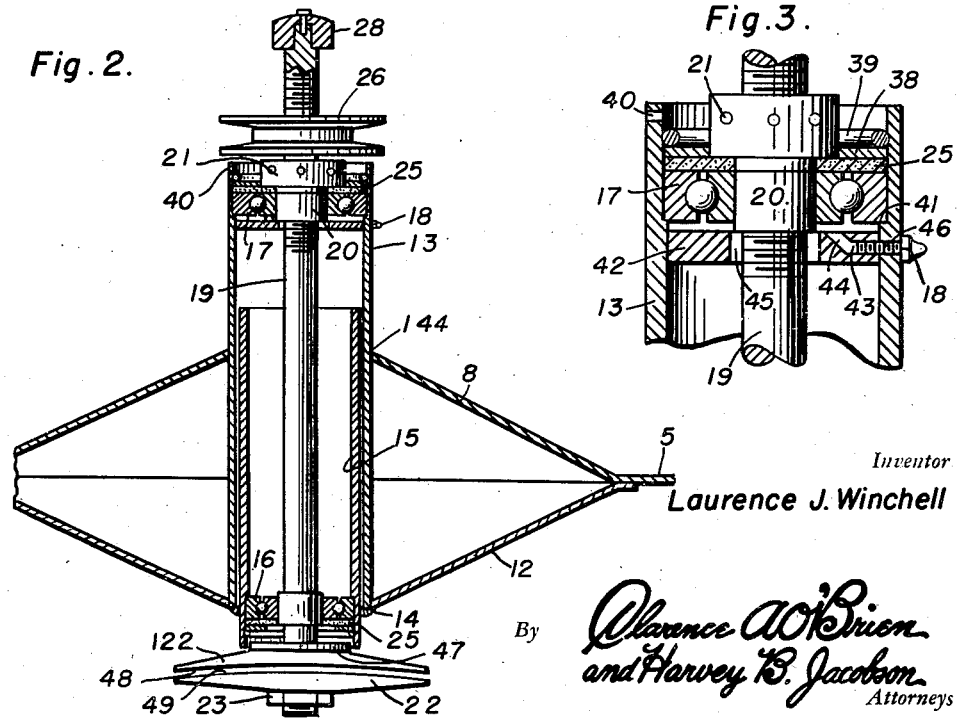
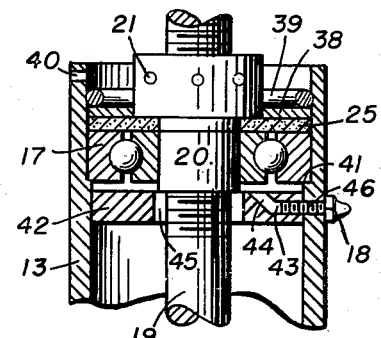
Inventor
Laurence J. Winchell
By Clarence A. O'Brien
and Harvey B. Jacobson
Attorneys Patented Oct. 11, 1949

2,484,201

UNITED STATES PATENT OFFICE 2,484,201

LAWN MOWER

Laurence J. Winchell, Fort Scott, Kans.

Application May 28, 1947, Serial No. 750,915

8 Claims. (Cl. 56—25.4)

This invention relates to improvements in lawn mowers of the type disclosed in my U. S. Letters Patent No. 2,259,676, dated October 21, 1941, wherein there is provided a motor driven elongated cutting blade which rotates about a vertical axis beneath a wheeled platform.

The primary object of the present invention is to provide novel and improved means for mounting the shaft of the cutting blade so as to effectively brace the same in a truly vertical position and to provide for vertical adjustment thereof so as to vary the distance between the cutting blade and the ground and thereby regulate the height at which the grass or other growth is cut relative to the ground.

A further object of the invention is to provide the mower with an improved form of handle and means for vertically adjusting the rear or hand grip portion thereof to suit the requirements of the particular person using the lawn mower.

A still further object is to provide an improved cutter shaft lubricating means.

And a final object of the invention to be specifically enumerated herein, is to effect a dirt seal between the cutter blade assembly and the lower end of the vertical housing.

The exact nature of the present invention, as well as more specific objects and features thereof, will become apparent from the following description when considered in connection with the accompanying drawing, in which:

Figure 1 is a side elevational view, partly broken away and in section, of a lawn mower constructed in accordance with the present invention;

Figure 2 is an enlarged fragmentary view partly in elevation and partly in section on the plane of line 2—2 of Figure 1; and Figure 3 is an enlarged detail view similar to Figure 2 and in vertical section taken at a slight angle to Figure 2 in order to show more clearly the lubricating structure of a bearing assembly.

Referring in detail to the drawing, 5 indicates a horizontal elongated sheet metal platform which is stamped or pressed to have integral front wheel guards 6, depending side and end flanges 7, and an upwardly dished portion 8 intermediate the ends and midway between the sides of the platform. The rear end of the platform is supported by co-axial rear wheels 9, while the front end of the platform is supported by co-axial front wheels 10 as disclosed in my above-mentioned patent. Suitable guards for the rear wheels 9 are attached to opposite sides of the platform 5 as indicated at 11.

Welded or otherwise rigidly secured to the underside of platform 5 coincident with the upwardly dished portion 8 of the latter is a downwardly dished sheet metal disk 12 of a form and size similar to the dished portion 8. The portion 8 and disk 12 have central vertically aligned openings through which extend a vertical supporting sleeve 13, the sleeve 13 snugly fitting the openings and being welded to the portion 8 and disk 12 as indicated at 14 and 144. The sleeve 13 is thus effectively braced in a truly vertical position so as to provide a rigid durable construction that effectively resists displacement of the sleeve 13 from its truly vertical position. Snugly fitted in the lower portion of the sleeve 13 for vertical sliding adjustment therein is a second shorter sleeve 15 having a ball bearing 16 mounted in the lower shouldered portion thereof. A further ball bearing 17 is mounted in the upper shouldered end portion of the longer outer sleeve 13, and the latter is provided at a point between the bearing 17 and the upper end of sleeve 15 with a grease fitting 18 to facilitate the introduction of lubricant within said sleeves 13 and 15, whereby to keep the bearings 16 and 17 effectively lubricated in a manner to be set forth hereinafter.

A shaft 19 extends through the sleeves 13 and 15 and has the inner races of the bearings 16 and 17 secured thereon to turn therewith. Adjustably threaded on the upper end portion of shaft 19 is a nut member or collar 20 on which the inner race of the upper bearing 17 is secured as by a press fit. The collar 20 has apertures 21 for engagement by a suitable tool for holding the nut member 20 against turning, and whereby simultaneously rotating shaft 19, the latter may be vertically adjusted therein.

Secured on the projecting lower end of shaft 19 between a pair of clamping plates 122 and 22, and whose adjacent surfaces are respectively concaved and convexed as shown in an exaggerated manner in Figure 2, by means of a clamping nut 23, is an elongated cutting blade 24. It will thus be seen that by adjusting shaft 19 vertically in the nut 20, the distance of the cutting blade 24 from the ground may be varied to cut the growth or grass at a selected height above the ground. The uppermost plate 122 is of sufficient diameter to overlap or cover and shield the lower end of sleeve 15 to prevent grass or dirt entering the bearing.

Suitable grease retainers are provided at 25 within the tube 13 above bearing 17 and within the tube 15 below the bearing 16. These retainers are of identical construction and as shown in Figure 3, includes packing member 25, a washer 38 and a split retaining ring 39 seated in an annular groove in the two sleeves.

Adjustably threaded on the projecting upper portion of shaft 19 is a pulley 26 which may be screwed down upon the shaft until it abuts the collar 20 and acts as a lock nut therefor. When so locked, the pulley becomes a driving means for rotating the shaft. By unscrewing the pulley, the collar 20 is released and the shaft is free to rotate relative to the supporting collar. A suitable knob or handle 28 is removably secured upon the upper end of shaft 19 for use in turning the latter when effecting its vertical adjustment, the pulley being released as above mentioned. An endless belt 29 passes around the pulley 26 and also around a pulley 30 secured on the drive shaft of a motor or engine 31 which is mounted on the rear portion of platform 5. Thus, the motor or engine 31 is used to drive the cutting blade 24 while the lawn mower is pushed ahead during the mowing operation. Such motor or engine may be suitably controlled to regulate the speed of rotation of the cutting blade while the mower is in use. The cutting blade 24 is provided with suitable cutting edges at opposite sides of opposite ends thereof, and it is preferably of slightly upwardly bowed form as shown, this flexing or bowing of the blade being assisted by the above described concave and convex surface of the nuts 122 and 22.

An upwardly and rearwardly extending handlebar assembly 32 of any suitable construction and forming no part of the invention as claimed, is attached to the platform 5 adjacent each side of the latter, and the handle-bar assembly is connected to the rear end of the platform 5 by means of a brace 33 of any desired type. The handlebar assembly has a downwardly directed forward end portion 34 which is bolted through the platform 5 as at 35 in front of the rear wheels 9.

Assuming that the cutting blade 24 is in the raised position shown in the drawing, and that it is desired to adjust the same downwardly, the pulley 26 is adjusted upwardly by rotating the same while holding the shaft 19 stationary thereby releasing the collar 20 for rotation on shaft 19. A suitable tool is inserted through an aperture 40 of sleeve 13 and engaged in bores 21 of collar 20 to secure the latter against rotation. The shaft 19 is then rotated relative to nut member or collar 20 so as to adjust the shaft 19 downwardly to the required distance. The pulley 26 is then tightened into locking engagement with collar 20 so that the cutting blade is maintained in the required adjusted position relative to the ground. A reversal of this operation will of course effect a desired elevation of the cutter 24 from a lowered adjusted position.

As shown best in Figure 3 the sleeve 13 has an internal shoulder 41 upon which the outer race of bearing 17 seats and is retained by the engagement of the sealing means above set forth. A plate 42 preferably of aluminum or the like is snugly fitted in the bore of sleeve 13 immediately below the bearing 17, and has an enlarged central opening 45 loosely surrounding shaft 19 in spaced relation thereto.

The plate 42 has an internally threaded bore 43 which receives the threaded end of the grease fitting 18, thereby securing the plate in position. An upwardly inclined passage 44 intersects passage 43 thereby establishing communication between the fitting 18 and the space between the baffle or plate 42 and the bearing.

Grease supplied to fitting 18 therefore is first applied to upper bearing 17 and thence is supplied by hole 45 to the lower bearing.

From the foregoing description, it is believed that the construction, operation and advantages of the present invention will be readily understood and appreciated by those skilled in the art. Minor changes are contemplated such as fall within the scope of the invention as claimed.

What I claim is:

1. A lawn mower comprising a platform having supporting wheels, complementary upwardly and downwardly dished centrally apertured portions on said platform, a sleeve secured to each of the said portions and extending through the apertures thereof, a vertical shaft extending through said sleeve and having a cutting blade secured to the lower end thereof beneath said platform, means for rotating said shaft, means for journalling said shaft in said sleeve.

2. The combination of claim 1 wherein said shaft has its lower portion journalled in an inner sleeve slidably received in said first sleeve.

3. The combination of claim 2 wherein said inner sleeve extends through that portion of the first mentioned sleeve which is received between the central apertures of the complementary portions.

4. The combination of claim 1 wherein said last means comprises a bearing fixedly positioned in the upper end of said sleeve, said shaft being journaled in said bearing and slidable therein for vertical adjustment.

5. The combination of claim 1 wherein said last means comprises a bearing fixedly positioned in the upper end of said sleeve, said shaft being journaled in said bearing and slidable therein for vertical adjustment, an inner sleeve slidable in said first mentioned sleeve, a bearing fixedly positioned in the lower end of the inner sleeve, said shaft having its lower end secured to said last mentioned bearing.

6. A lawn mower comprising a platform having supporting wheels, said platform having an apertured portion, a frusto-conical member secured to said platform and having an opening spaced vertically from the aperture, a vertical sleeve secured to said platform and said member and extending through the aperture and opening, a vertical shaft rotatably journaled in the sleeve and having a cutting blade secured to the shaft beneath the platform, means for rotating the shaft and blade.

7. The combination of claim 6 including a second sleeve slidably carried by the first-mentioned sleeve for vertical movement relative thereto, a bearing in each of said sleeves, said shaft being journaled in said bearings.

8. The combination of claim 6 including a second sleeve slidably journaled for vertical movement in the first-mentioned sleeve, a pair of bearings fixedly secured, one in each of said sleeves, at opposite ends thereof, said shaft being journaled in said bearings.

LAURENCE J. WINCHELL.

REFERENCES CITED

The following references are of record in the file of this patent:

UNITED STATES PATENTS

| Number | Name | Date |
| --- | --- | --- |
| 1,622,611 | Sera | Mar. 29, 1927 |
| 2,164,449 | Delaval-Crow | July 4, 1939 |
| 2,221,457 | Pope et al. | Nov. 12, 1940 |
| 2,259,676 | Winchell | Oct. 21, 1941 |
| 2,329,185 | Coddington | Sept. 14, 1943 |